(12) United States Patent
Kimura

(10) Patent No.: US 7,321,440 B2
(45) Date of Patent: Jan. 22, 2008

(54) PRINT JOB MANAGING APPARATUS AND PRINT JOB CONTROL METHOD

(75) Inventor: Shougo Kimura, Tokyo (JP)

(73) Assignee: Panasonic Communications Co., Ltd., Fukuoka (JP)

(*) Notice: Subject to any disclaimer, the term of this patent is extended or adjusted under 35 U.S.C. 154(b) by 842 days.

(21) Appl. No.: 10/267,671

(22) Filed: Oct. 10, 2002

(65) Prior Publication Data

US 2003/0107761 A1 Jun. 12, 2003

(30) Foreign Application Priority Data

Dec. 7, 2001 (JP) ............................. 2001-374665

(51) Int. Cl.
*G06F 3/12* (2006.01)
(52) U.S. Cl. .................. 358/1.15; 358/1.16; 358/1.13; 358/1.2; 358/1.6
(58) Field of Classification Search ............... 358/1.15, 358/1.16, 1.2, 1.6, 1.13; 400/61
See application file for complete search history.

(56) References Cited

U.S. PATENT DOCUMENTS

| | | | |
|---|---|---|---|
| 5,873,659 A * | 2/1999 | Edwards et al. | 400/61 |
| 6,633,395 B1 * | 10/2003 | Tuchitoi et al. | 358/1.14 |
| 6,709,176 B2 * | 3/2004 | Gotoh et al. | 400/61 |
| 6,965,931 B2 * | 11/2005 | Helms | 709/223 |
| 6,980,305 B2 * | 12/2005 | Martinez | 358/1.1 |

FOREIGN PATENT DOCUMENTS

| | | |
|---|---|---|
| JP | 7-104955 | 4/1995 |
| JP | 10-143338 | 5/1998 |
| JP | 11-095942 | 4/1999 |
| JP | 11134300 | 5/1999 |
| JP | 2000-089924 | 3/2000 |
| JP | 2000-181655 | 6/2000 |
| JP | 2000-311068 | 11/2000 |
| JP | 2001159963 | 6/2001 |
| JP | 2001-251454 | 9/2001 |

OTHER PUBLICATIONS

Windows 2000 Network Printers and Print Services Administration http://www.microsoft.com/technet/windows2000serv/support/c16w2kad.mspx.*

(Continued)

*Primary Examiner*—Twyler Lamb
*Assistant Examiner*—Vu Hang
(74) *Attorney, Agent, or Firm*—Greenblum & Bernstein, P.L.C.

(57) ABSTRACT

A host that controls jobs of a printer obtains client identifying information within a job control request, which is received from a terminal, while obtaining the job information and client identifying information of the print request from the printer, and storing the same in a job information storage unit. For each job included in the job information that is obtained from the printer, a job control capability determiner compares the client identifying information (of print requester) and client identifying information of the terminal that made a control request. When both of the client identifying information is identical, it is determined that the control is allowed. When it is not identical, it is determined that the control is not allowed.

10 Claims, 16 Drawing Sheets

OTHER PUBLICATIONS

English Language Abstract of JP 11-095942.
English Language Abstract of JP 10-143338.
English language Abstract of JP 7-104955.
English Language Abstract of JP 2000-089924.
English Language Abstract of JP 2001-251454.
English Language Abstract of JP 2000-181655.
English Language Abstract of JP 2000-311068.
English Language Abstract for JP Appln. No. 11-134300.
English Language Abstract for JP Appln. No. 2001-159963.

* cited by examiner

Fig.5

51 {
- control command: ××××
- document name: ××××
- user name: ××××
- IP address: ×××、×××、×××
- printer language: ×××
- control command: ×××

52 {
- print data

- control command: ×××
- print job termination command: ×××
- control command: ××× default screen during browser initialization apparatus list display screen

Fig.14 job list status/information/ job information

| | job number | job name | machine name | time | data size | user ID | status |
|---|---|---|---|---|---|---|---|
| ☐ | 0 | Test Page | Tree | 2001/4/23 16:17:13 10 | 10000 | 1 | spooling(3) |
| ☐ | 1 | Test Page | Test | 2001/5/21 9:18:16 17 | 10000 | 1 | spooling(3) |
| | 2 | Test Page | Tree | 2001/5/26 8:21:18 21 | 10000 | 1 | spooling(3) |

| delete | clear |
|---|---|

When check box is selected and delete button is cleared,Selected job willbe deleted.

Status Monitor

PRINT JOB MANAGING APPARATUS AND PRINT JOB CONTROL METHOD

BACKGROUND OF THE INVENTION

1. Field of the Invention

The present invention relates to a print job managing apparatus and print job controlling method that can control a spooled print job in a printer connected to a network, from a client computer (hereafter referred to as "terminal").

2. Description of Related Art

Conventionally, print job managing systems have been introduced that can control (e.g., delete) a spooled print job in the printer connected to a network, from a terminal via the network. Such print job managing system are configured so that a printing job spooled in a printer is controlled from a host computer (hereafter referred to as "host"). When a control request is made to a host from a terminal, which is requesting a print job control, whether the terminal has permission for a job control is checked, from a password input at the terminal. Upon confirming the permission, the host receives the request, e.g., deleting/prioritizing of a print job, and performs the job control on the printer in response to the request.

In the conventional print job managing system as described above, the host demands a password input every time a user attempts to control a job from the terminal, in order to determine whether the attempt is coming from a system manger or a general user.

However, since the password input is required every time a print job control is needed, such operation is very cumbersome. Moreover, it is difficult to control print jobs, as one terminal cannot control only the print jobs performed by the particular terminal.

SUMMARY OF THE INVENTION

This invention is provided to address the above described problems. The object of the present invention is to provide a print job managing apparatus and print job control method that is easy to use, eliminating the bother of inputting a password for every print job control and enabling a terminal to control only the print jobs performed by the particular terminal.

According to the present invention, client identifying information of a requester for a job, which is spooled in a printer, and client identifying information of a client that has made a job control request is compared. When the information is identical, the control of the job is enabled. When it is different, the control of the job is not allowed.

Accordingly, it is possible for a client to control only the jobs performed by the client, without inputting a password every time the control screen is displayed.

Moreover, by giving permission as manager to predetermined clients, it is possible for such manager terminal to control all jobs.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 is a data configuration of the print data according the first embodiment of the present invention;

FIG. 14 illustrates a display job information screen at the terminal according the first embodiment of the present invention;

DETAILED DESCRIPTION OF PREFERRED EMBODIMENTS

The embodiments of the present invention, relating to print job managing apparatus and print job control method, are explained in the following, in reference to the above-described drawings.

First Embodiment

Figure 1:
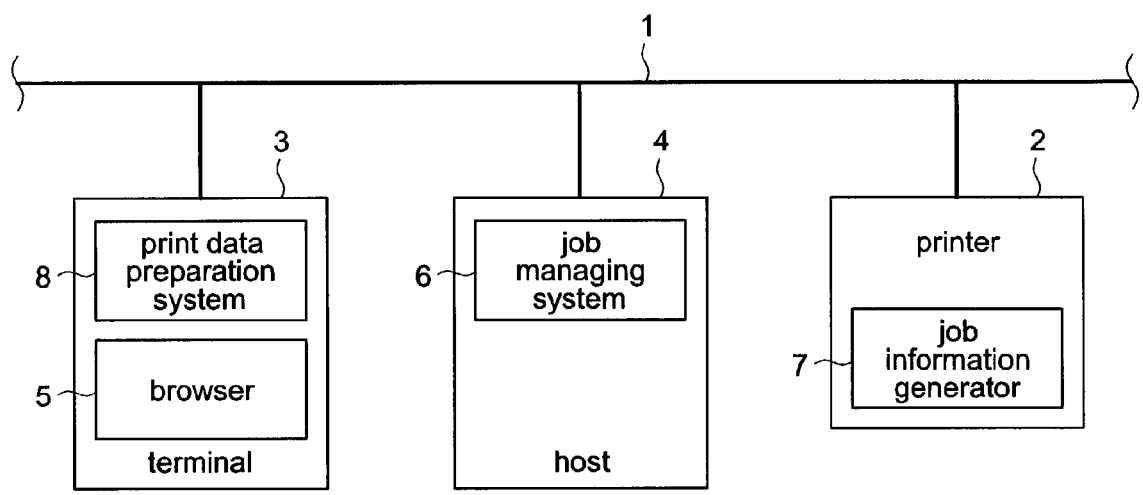
FIG. 1 illustrates a system configuration according to first and second embodiments of the present invention.

FIG. 1 illustrates a system configuration according to the first embodiment of the present invention. As shown in FIG. 1, the system includes printer 2, terminal 3 that transmits a print request to printer 2, and host 4 that manages a job spooled in printer 2 and performs a job control in response to the request from terminal 3, all of which are mutually connected for communicating via local area network (LAN) 1. Terminal 3 includes general functions to operate as a personal computer, as well as print data preparation system 8 that performs a process adding an IP address of terminal 3 to a document generated by a word processing software, and browser 5 that provides a user with a job control environment. Host 4 includes job managing system 6 that provides a later-described job control. Printer 2 includes job information generator 7 that generates job information related to print data received from terminal 3.

Figure 2:
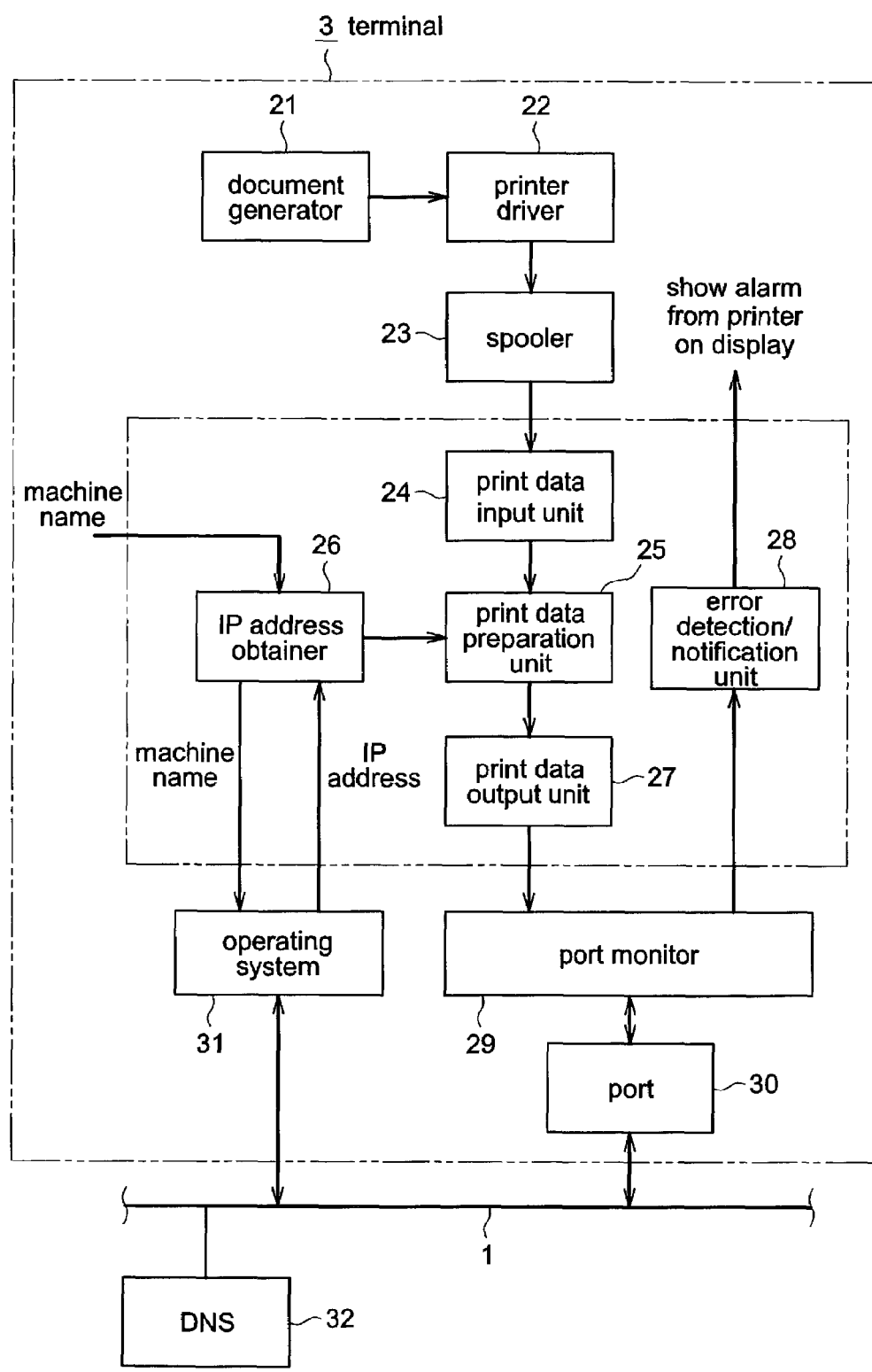
FIG. 2 is a functional block diagram of a terminal according the first embodiment of the present invention.

FIG. 2 is a functional block diagram relating to print data preparation that is mainly operated by print data preparation system 8 of terminal 3. The following illustration is provided for printing a document generated by document generator 21, which is configured with a word processing application that operates on operating system 31 of terminal 3. In addition, documents for printing are not limited to text documents. Documents may include data such as image data and spreadsheet generated by a spreadsheet software.

Printer driver 22 is installed in terminal 3, in order to convert print data to comply with printer 2, from which the print data is output. Printer driver 22 is initialized when document generator 21 has an open generated document and the user gives a print instruction. Print data processed by printer driver 22 is stored in spooler 23.

Print data preparation system 8 is configured based on a so-called language monitor. Print data stored in spooler 23 of terminal 3 is retrieved into print data preparation system 8 in the order of jobs. This retrieving operation of print data stored in spooler 23 is performed by print data input unit 24. Print data retrieved by print data input unit 24 is delivered to print data preparation unit 25.

IP address obtainer 26 has a function that obtains a machine name of terminal 3 and informs the machine name to DNS 32 via operating system 31, and inquires about the IP address of terminal 3. When the IP address of terminal 3 is obtained based on the machine name, the IP address is given to print data preparation unit 25. Machine name can be obtained from print data when it is included in the print data. However, in a multi-use operating system, job structure is obtained by using the operating system function, based on the job number included in the agreement when the language monitor is called up, and the machine name is obtained by referring to its "Machine Name" within the structure.

The IP address of terminal 3 is used to determine whether the requester of a print request and the requester of a job control request are identical at host 4 as described below. However, instead of an IP address, other information may be used to have the similar effect, as long as terminal 3 is recognized from data included in both print data and job control request. For example, a machine name included in print data can be used, as well as other identifying information that may be included in both print data and job control request.

Print data preparation unit 25 performs a process in which the IP address of terminal 3, which is delivered from IP address obtainer 26, is added to print data, which is delivered from print data input unit 24. Print data with the IP address of terminal 3, which is inserted in a header, is transmitted to port monitor 29 by print data output unit 27.

In addition, print data preparation system 8 has primary functions as a language monitor. For example, error detection/notification unit 28 performs a process that detects an error informed by the printer and displays the detected error by a mutual communication with printer 2, when the print data is transmitted to printer 2. Moreover, print data output unit 27 divides the print data into a buffer size of printer 2, and outputs the same to port monitor 29. The buffer size of printer 2 is based on the information that is informed from printer 2, using the language monitor function.

Port monitor 29 monitors printer 2 and communicating port 30. When a notification from printer 2 is sent, port monitor informs the language monitor side about the notification. When there is data transmitted to printer 2, conversely, port monitor 29 outputs the data to port 30 for the transmission to printer 2.

Figure 3:
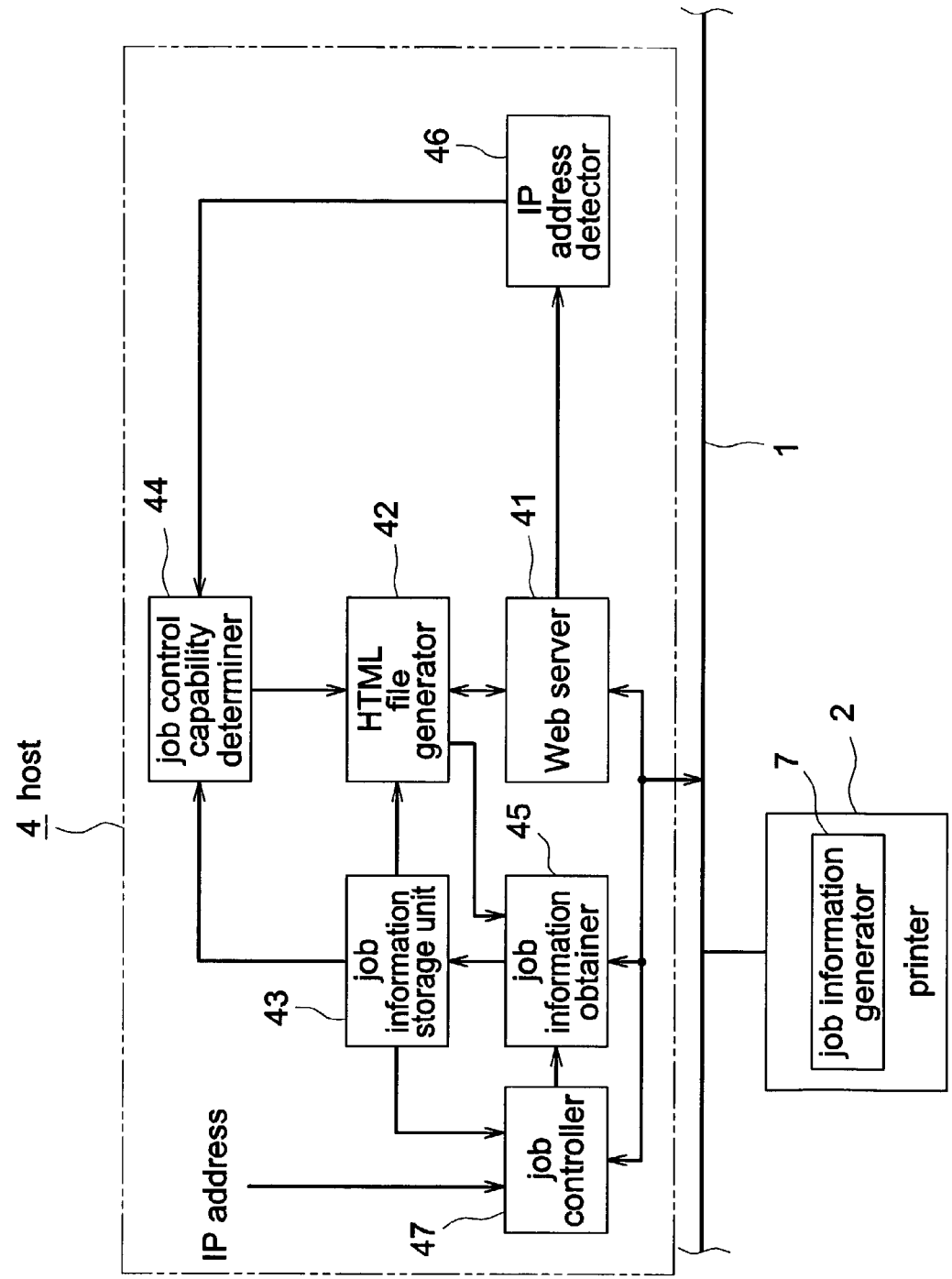
FIG. 3 is a functional block diagram of a host according the first embodiment of the present invention.

FIG. 3 is a block diagram illustrating a configuration of job managing system 6 of host 4. Web server 41 distributes an HTML file to provide the user with a job control environment, the user accessing the server via browser 5 of terminal 3.

HTML file generator 42 generates and manages the HTML file. HTML file generator 42 generates a job list screen based on job information that is stored in job information storage unit 43 and a determination result given by job control capability determiner 44. Job information stored in job information storage unit 43 is stored when job information obtainer 45 obtains the job information that is generated by job information generator 7. Job control capability determiner 44 compares the IP address of terminal 3 that sends a file request to web server 41 and the IP address of print requester that is added to the job displayed on the job list, in order to determine whether the control for each job displayed on the job list is allowed. The IP address of terminal 3 is detected by IP address detector 46, when the terminal 3 transmits a file request to web server 41. Job controller 47 outputs instructions such as a deletion of a job spooled in printer 2.

The following provides detail illustrations of operations at terminal 3, printer 2 and host 4, according to the above-described configuration of the embodiment.

Figure 4:
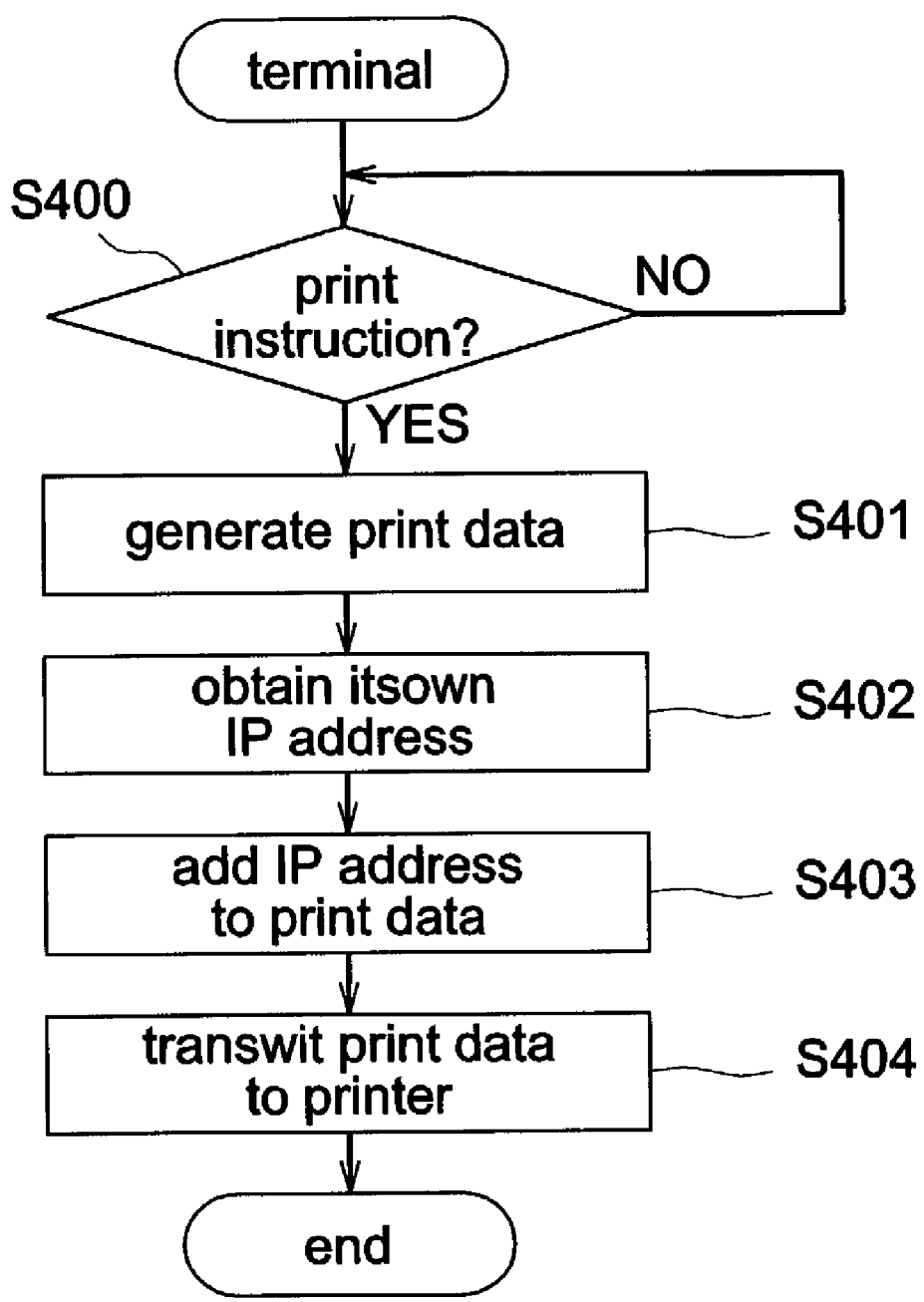
FIG. 4 is a flowchart of the terminal until the terminal transmits print data according the first embodiment of the present invention.

FIG. 4 is a flowchart illustrating an operation of terminal 3, when terminal 3 transmits print data to printer 2. For example, when a user gives a print instruction while document generator 21 has an open processed document (step S400), printer driver 22 is initialized to generate a print data by converting the document (given by document generator 21) into a format that is compliant with printer 2 (step S401). Then, print data input unit 24 retrieves the print data stored in spooler 23 and gives the same to print data preparation unit 25, while IP address obtainer 26 obtains the IP address of terminal 3 that made a print request with the above-described method (step S402) and gives the same to print data preparation unit 25. Print data preparation unit 25 adds the IP address of terminal 3 (print requester) to print data in a predetermined format (step S403).

FIG. 5 illustrates an example of print data format to which an IP address is attached. Numerical character 51 in the figure illustrates the added IP address, while numerical character 52 illustrates print data. Print data to which an IP address attached is output to port monitor 29 from print data output unit 27, and forwarded to printer 2 via port 30 in accordance with printer 2 (step S404).

Figure 6:
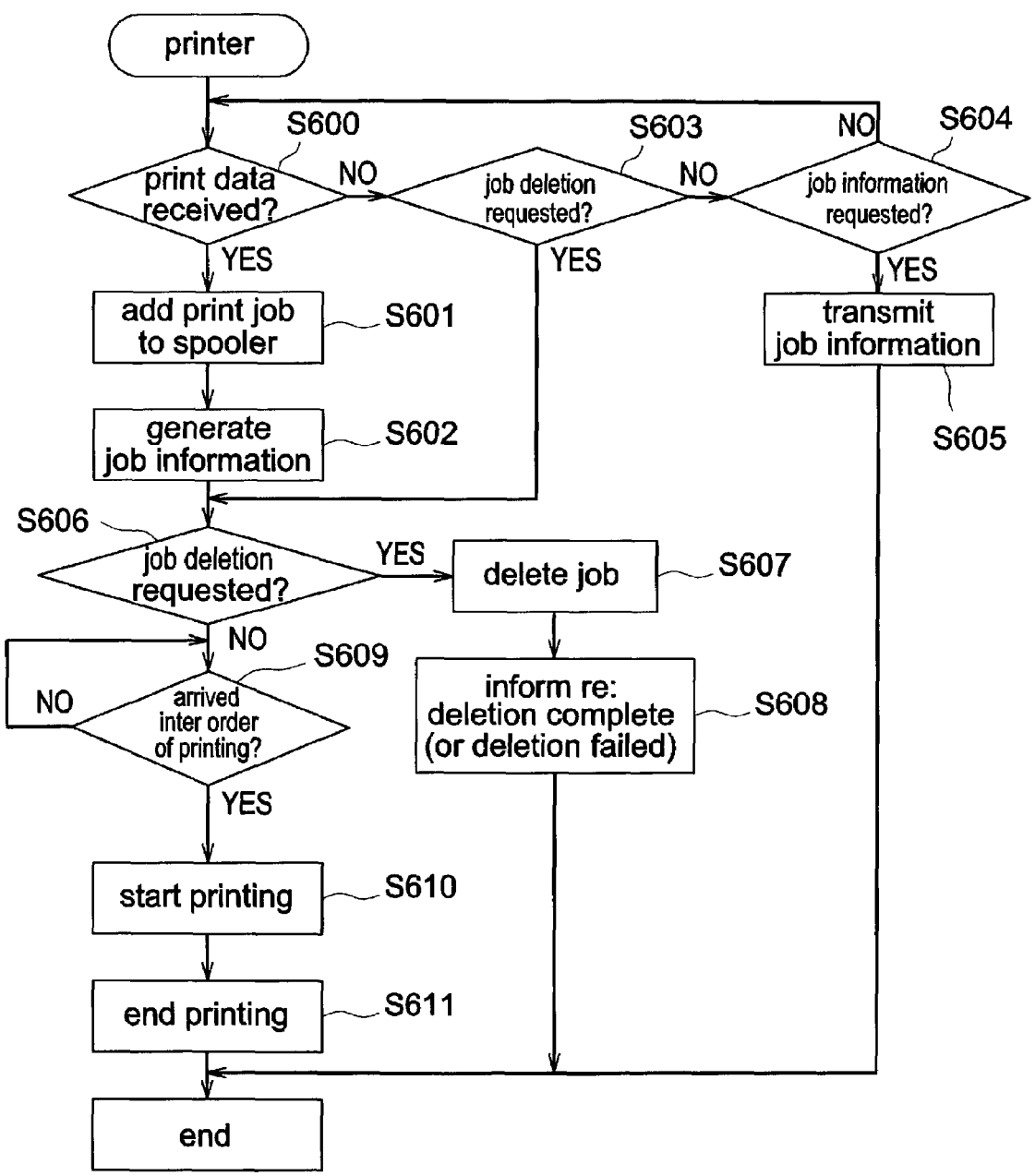
FIG. 6 is a flowchart of a printer according the first embodiment of the present invention.

FIG. 6 is a flowchart illustrating an operation of printer 2. First, an operation of printer 2, when printer 2 receives print data from terminal 3, is illustrated.

Figure 7:
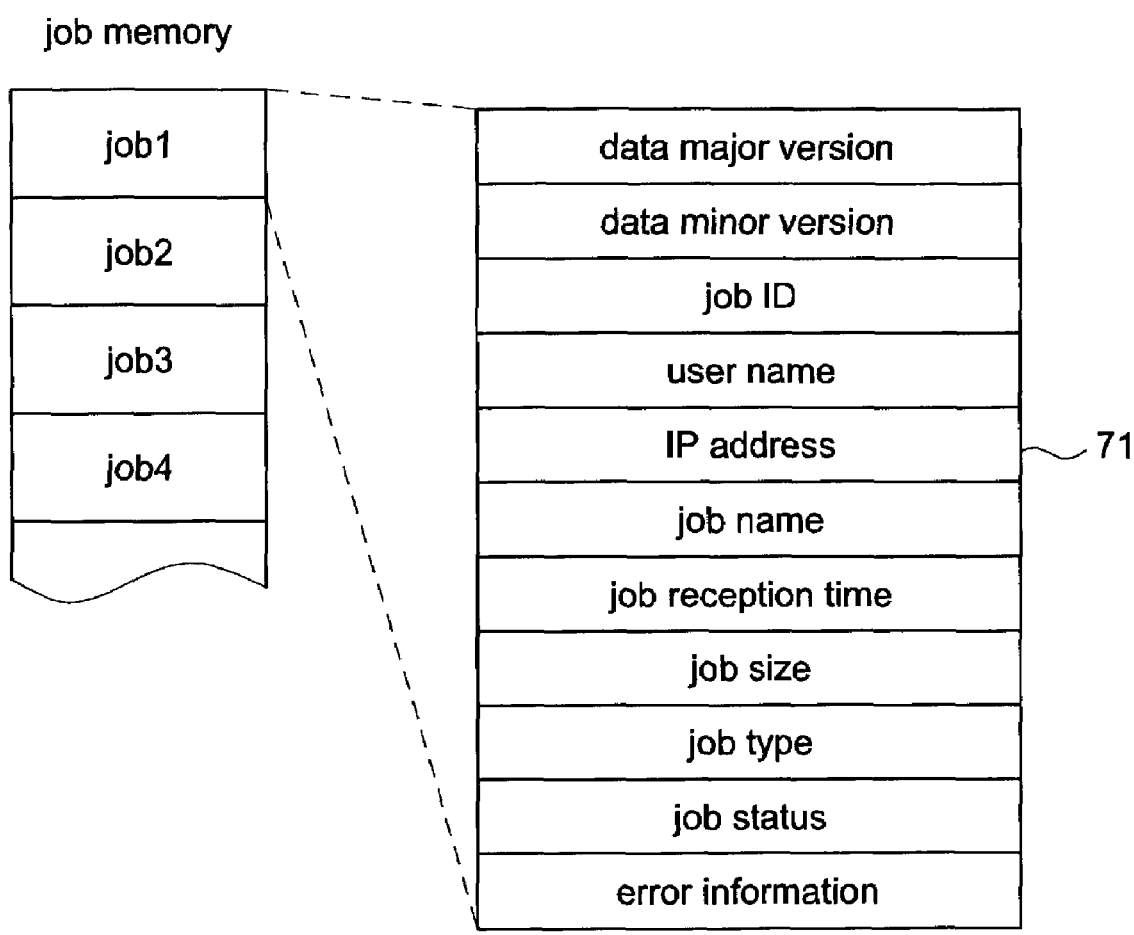
FIG. 7 is a schematic illustration of a job memory of the printer according the first embodiment of the present invention.

Upon receiving print data that includes the IP address of terminal 3 (print requester) (step S600), printer 2 adds the print job related to the print data to the spooler within printer 2 (step S601). Then, job information generator 7 generates job information relating to the print data (step S602), and stores the information in a job memory within printer 2. FIG. 7 is a schematic diagram illustrating a job memory storing job information in a job unit. Each unit of job information includes the IP address of terminal 3 (print requester), which is added to print data at terminal 3.

As described above, print data including the IP address, transmitted from terminal 3, is spooled in printer 2, while job information including the IP address is stored in a job memory of printer 2.

Figure 8:
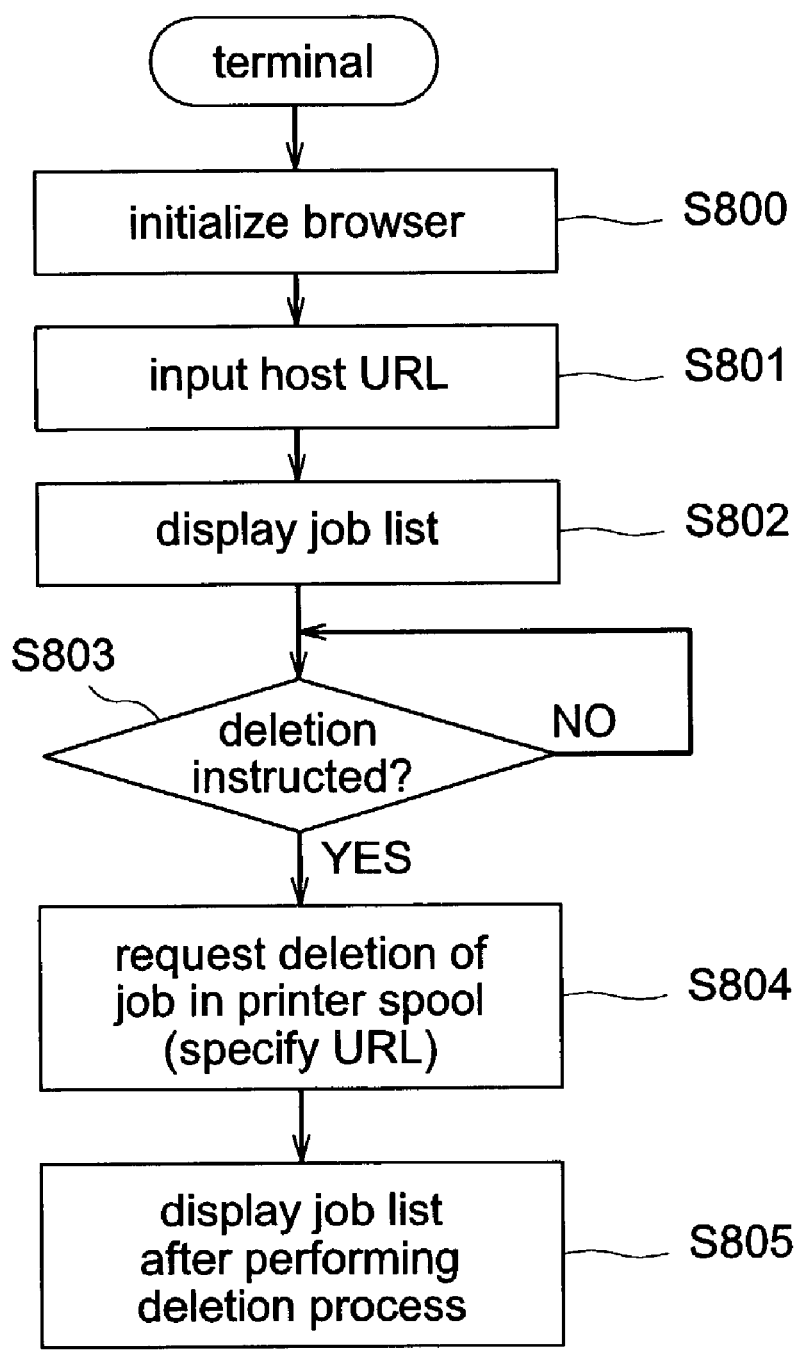
FIG. 8 is a flowchart illustrating a job control by the terminal according the first embodiment of the present invention.
Figure 9:
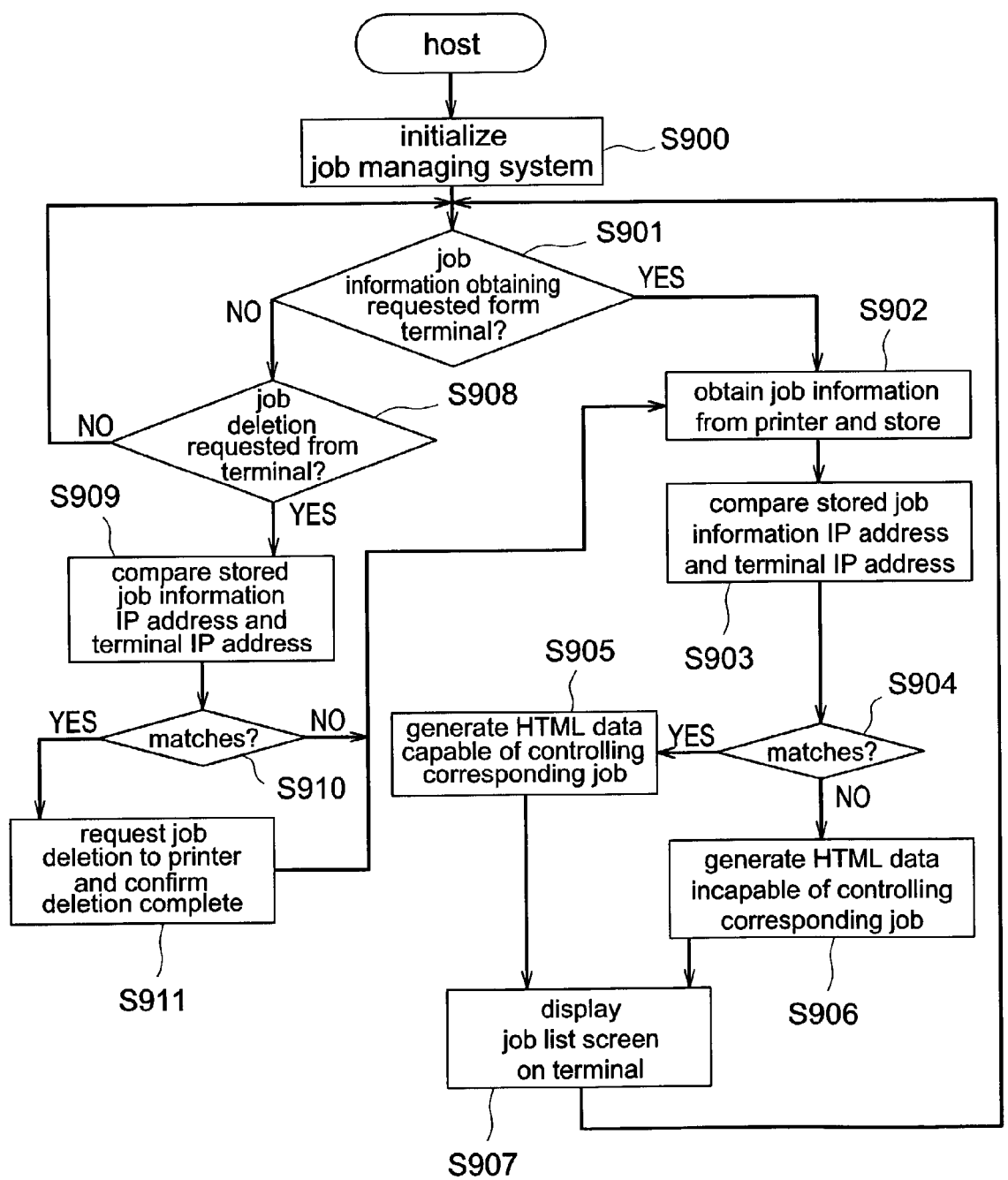
FIG. 9 is a flowchart illustrating a job managing system at the host according the first embodiment of the present invention.
Figure 10:
FIG. 10 illustrates a screen when a browser is initialized at the terminal according the first embodiment of the present invention.

FIG. 8 is a flowchart in which terminal 3 performs a job control. FIG. 9 is a flowchart in which host 4 controls a job that is spooled in printer 2. When the user controls a job spooled in printer 2, browser 5 is initialized on terminal 3. Upon initializing browser 5 (step S800), terminal 3 requests an input of URL of the accessing destination, by displaying a default screen shown in FIG. 10. In order to control a job, an URL of host 4 needs to be input as an address (step S801). The URL of host 4 can be selected from a pre-registered destination list, or automatically input when the user specifies that it is a job control on the screen.

Figure 11:
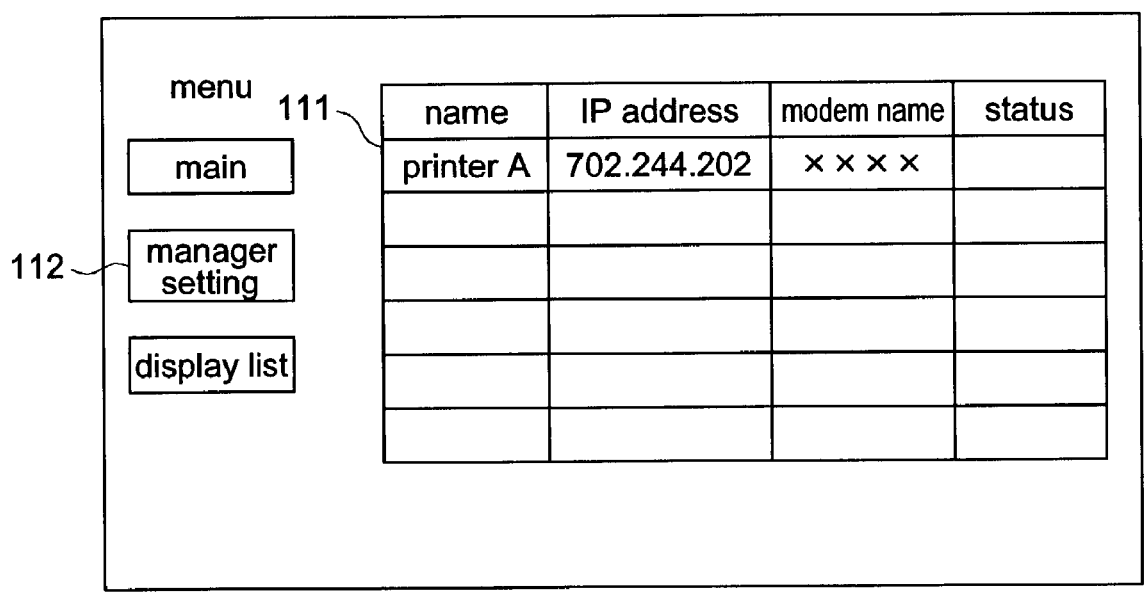
FIG. 11 illustrates an apparatus list display screen at the terminal according the first embodiment of the present invention.

In this embodiment, when web server 41 is accessed by using the URL of host 4, web server 41 responds by transmitting a "apparatus list display screen" shown in FIG. 11. The "apparatus list display screen" displays all of the apparatuses managed by host 4. When a desired apparatus name 111 is selected from the machine list, a control screen of the selected apparatus is displayed. In the "apparatus list display screen" of FIG. 11, printer A is the apparatus name for printer 2. By clicking "printer A" from the "apparatus list display screen", data relating to printer 2 is requested from web server 41 of host 4.

Figure 12:
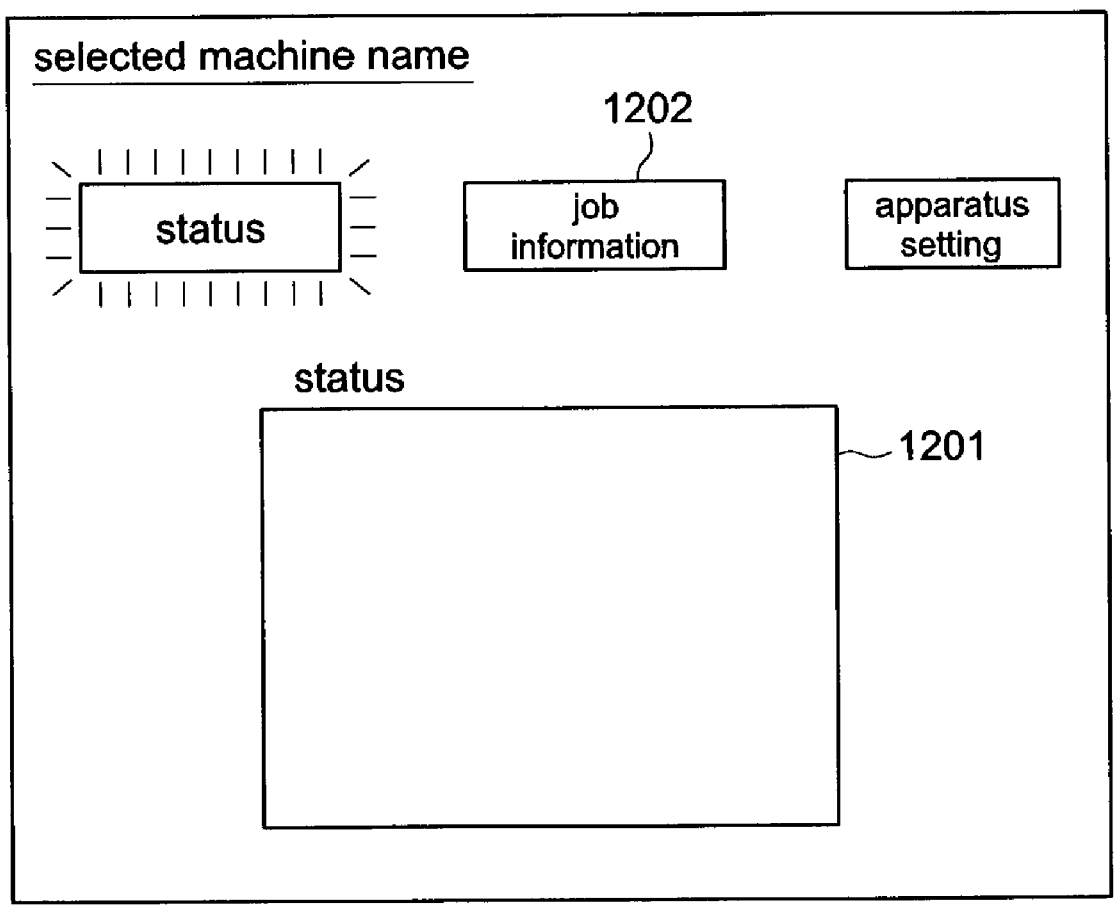
FIG. 12 illustrates a screen displayed when the printer is selected at the terminal according the first embodiment of the present invention.

In the present embodiment, a status screen relating to printer 2 is displayed as a initial screen as shown in FIG. 12. A status screen displays status image area 1201 that indicates current status of printer 2 and "job information" button 1202 that displays the job information.

When the user clicks "job information" button 1202, terminal 3 requests job information of the job, which is spooled in printer 2, from web server 41 of host 4. In the flowchart of FIG. 8, this part of the process is omitted.

Also, in host 4, job managing system 6 is initialized (step S900). From the above-described data exchanges made by web server 41 and terminal 3, the requested file is retrieved from HTML file generator 42 and transmitted to terminal 3. The HTML file that displays the screens of FIGS. 11 and 12, is successively updated by HTML file generator 42.

When web server 41 detects that terminal 3 has transmitted a job information obtaining request (step S901), HTML file generator 42 starts a process of generating a "job list screen", which is a list of jobs currently spooled in printer 2 (step S902).

Figure 13:
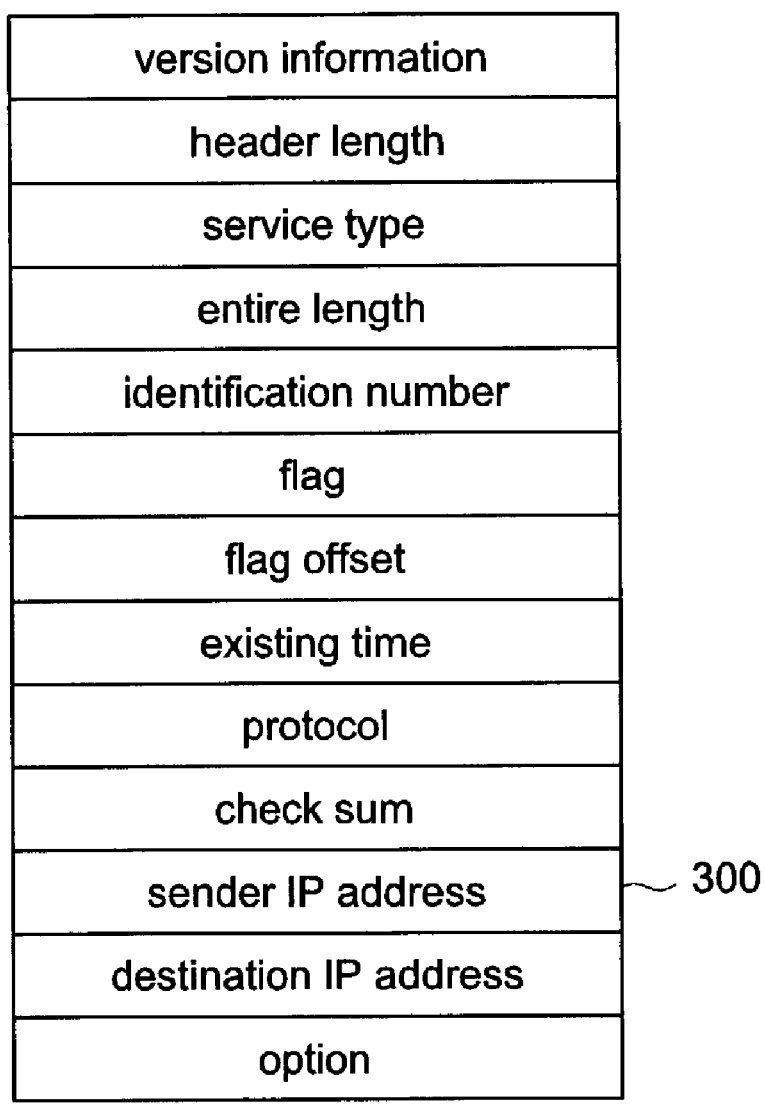
FIG. 13 illustrates a data configuration of an IP packet for TCP/IP communication.

The following illustrates the process of generating the "job list screen" more specifically. IP address detector 46 analyzes the job information obtaining request that is transmitted to web server 41 from terminal 3, and obtains the IP address of terminal 3, which is the requester. FIG. 13 illustrates a data configuration of the IP packet in the TCP/IP communication. As shown in FIG. 13, the IP packet transmitted between terminal 3 and host 4 includes sender IP address 300. Therefore, IP address detector 46 detects sender IP address 300 from the IP packet, which includes the job information obtaining request, and recognizes the same as the IP address of terminal 3. The detected IP address of terminal 3, which transmitted the job information obtaining request, is delivered to job capability determiner 44.

At the same time, in order to update the job information that is stored in job information storage unit 43, job information obtainer 45 transmits a request for a transmission of the current job information to printer 2.

As shown in FIG. 6, upon receiving the transmission request for the job information from host 4, printer 2 determines that job information request is received via the process of steps S600 and S603 (step S604). When the job information request is received, job information relating to all currently spooled jobs, which is stored in the job memory, is retrieved and transmitted to host 4 (step S605). When jobs from other terminals are spooled in printer 2, such job information will be transmitted together. Each piece of job information includes the IP address of each terminal that is the sender of the print request.

Accordingly, printer 2 performs only a simple process that reads out the job information relating to all the jobs that are currently spooled in the job memory, thus eliminating an unnecessarily burden of abnormal tasks for printer 2.

As described above, job information obtainer 45 of host 4 obtains the job information of all the jobs currently spooled in printer 2 (including IP address of the printer requesters) and updates the job information spooled in job information storage unit 43.

When the job information of job information storage unit 43 is updated with the newest data, job control capability determiner 44 compares an IP address included in each job information unit and the IP address of terminal 3 (sender of job information obtaining request) as shown in FIG. 9 (steps S903 and S904). When the IP address of the print requester included in the job information and the IP address of the job information obtaining requester are identical, it is determined that "the control is allowed". When both are not identical, it is determined that "the control is not allowed". When IP addresses are identical, it implies that the terminal that has requested the job spooled and the terminal that has sent the job information obtaining request are the same. Therefore, by identifying them as the same user, the job control is allowed to the terminal that sent the job information obtaining request.

When the IP addresses are not identical, it implies that the terminal that has requested the spooled job and the terminal that has sent the job information obtaining request are different. Therefore, by identifying them as different users, the job control is not allowed to the terminal that sent the job information obtaining request.

Accordingly, job control capability determiner 44 gives a determination: "control is allowed" or "control is not allowed" to all jobs stored in job information storage unit 43. The determination results are delivered to HTML file generator 42.

HTML file generator 42 generates a job list that lists information of each job name, machine name, time, data size, user ID and status, in the order of job numbers, based on the job information stored in job information storage unit 43.

FIG. 14 illustrates a screen configuration of a job list generated by HTML file generator 42, which is displayed on a display of terminal 3. As shown in FIG. 14, checkbox 400 is provided in relation to a job number, which is either selectable checkbox 401 or un-selectable checkbox 402. When the determination result is "control is allowed" for a job, the job number has selectable checkbox 401, whereas, when the determination result is "control is not allowed" for a job, the job number has un-selectable checkbox 402. In the example shown in FIG. 14, a terminal with machine name "Tree" is sending a job information obtaining request, and jobs with job numbers 0 and 2 are spooled in printer 2, by the print request made from the terminal with machine name "Tree". Accordingly, checkboxes 401 of job numbers 0 and 2 are selectable. However, checkbox 402, which is un-selectable from the terminal with machine name "Tree", is provided for job number 1, since the job is generated from another terminal with machine name "Test".

HTML file generator 42 generates HTML data that displays selectable checkbox 401 for a job with "control is allowed" determination result (step S905), and HTML data that displays un-selectable checkbox 402 for a job with "control is not allowed" determination result (step S906), in the job list.

Also, the job list display screen including the above job list provides "delete" button 403, in the bottom of the screen, that inputs a deleting instruction. When checkbox 402 is selected and "delete" button 403 is clicked, a job deletion order is transmitted to web server 41. The HTML file of the job list display screen that is generated according to the above description is transmitted to browser 5 of terminal 3 (requester) (step S907).

As shown in FIG. 8, when terminal 3 receives the HTML file of the job list display screen, terminal 3 displays the job list display screen (FIG. 14) including the above job list on the display (step S802). Then, terminal 3 monitors whether there is a control instruction for the job list display screen (step S803). (In this example, only "delete" instruction is provided. However, other control instruction can be done, if other control buttons are provided in the job list display screen.) For example, when a desired checkbox 401 is selected for the selectable job in the job list display screen, and when "delete" button 403 is clicked, job deletion request is sent to host 4 (step S804).

Job controller 47 of host 4 monitors whether a job deletion request is received from terminal 3 at step S908 as shown in FIG. 9. When the job deletion request is received, job controller 47 receives the IP address of terminal 3 that sent the job deletion request, from IP address detector 46. Upon finding the IP address included in the job information, which relates to the job deletion request, from job information storage unit 43, it is compared to the IP address of the terminal that sent the job deletion request (step S909). When both IP addresses are identical (step S910), it implies that the terminal that requested the deletion and the terminal that sent the print request job are the same. Therefore, the control request (deletion) is requested, since it is very likely that the control is requested from the same user, and job controller 47 instructs printer 2 to delete the job (step S911).

As shown in FIG. 6, when printer 2 receives the job deletion request from host 4 (step S606), the job with the deletion request is deleted from the spooler and the job memory is updated (step S607). Then, the deletion completion notification is transmitted to host 4 (step S608). When the deletion fails, the host 4 is notified of the same.

Upon receiving the deletion completion notification from printer 2 (step S911), job controller 47 allows job information obtainer 45 to obtain the job information after the job control, by moving to step S902. Upon performing the process from steps S902-907, the HTML file of the job list display screen after the job control is generated, and web server 41 transmits the HTML file of the job list display screen to terminal 3.

Accordingly, it is possible to incorporate whether printer 2 surely deleted the selected job. At the same time, when there is a status change in the job between the last update and the current time (except job deletion), it is possible to incorporate the job status after the change.

Moreover, in order to accelerate the response, the HTML file deleting only the information relating to the deleted job from the current job control may be returned to terminal 3, from the HTML file of the job list display screen, upon receiving the deletion completion notification from printer 2.

As shown in FIG. 8, in response to the job deletion request transmitted at step S804, the job list display screen after the job deletion is displayed at terminal 3 (step S805). Further, when more job control is performed, the same operation and process are repeated.

In the process of step S609 shown in FIG. 6, when printer 2 determines that the spooled jobs have arrived in the order of printing, the print data of the job is rasterized to start the printing operation (step S610). When the printing is finished (step S611), the process is completed.

Accordingly to the present embodiment, when terminal 3 adds its IP address to the print data and transmit the data to printer 2, and when terminal 3 makes a request for a job list display screen to host 4, host 4 obtains all the job information from printer 2, generates a job list display screen that only enables to control the jobs from terminal 3, which is currently requesting for the job list display screen, and transmits the data to terminal 3. Therefore, it is possible to limit a certain job control without requesting a password input, whenever the user attempts to control the print job. Also, it is possible to control only a print job made by a specific terminal (terminal 3), from terminal 3.

Second Embodiment

The following illustrates the second embodiment of the present invention. In the second embodiment, when a manager terminal makes a request for a job list display screen, the job control is not limited. Other configuration and operation are the same as the first embodiment.

Figure 15:
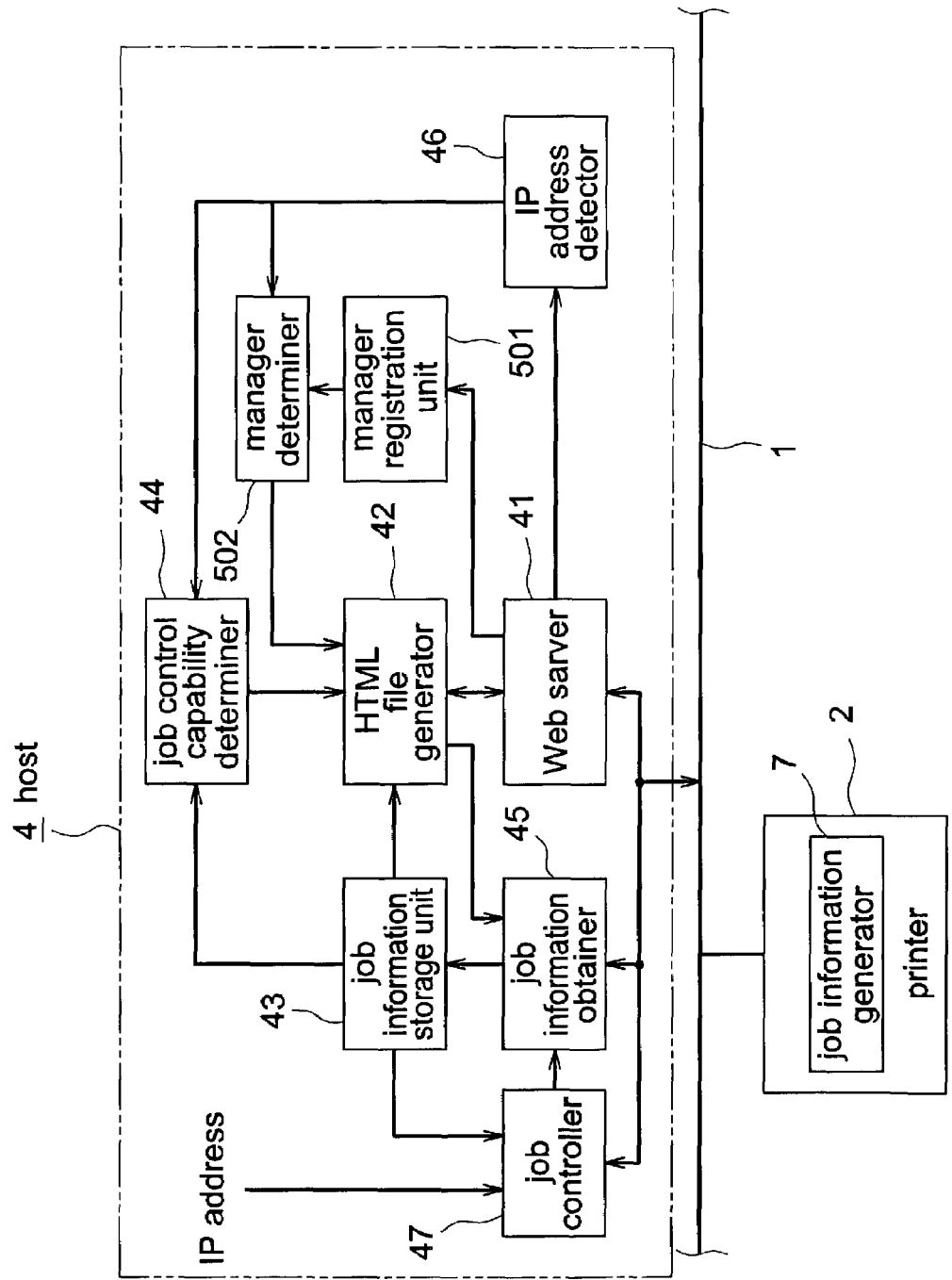
FIG. 15 is a functional block diagram of a host according the second embodiment of the present invention.

FIG. 15 is a block diagram illustrating a configuration of job managing system 6 at host 4. In FIG. 15, parts having the same numerical characters as the block diagram of job managing system 6 of FIG. 3 represent the same function; therefore the illustration of the same is omitted.

In the second embodiment, job managing system 6 is provided with manger registration unit 501 that receives a manager registration and stores the manager information, and manager determiner 502 that determines whether the accessing terminal is the manger terminal. HTML file generator 42 uses the determination result from manager determiner 502 and switches contents of the generated job list display screen.

Figure 16:
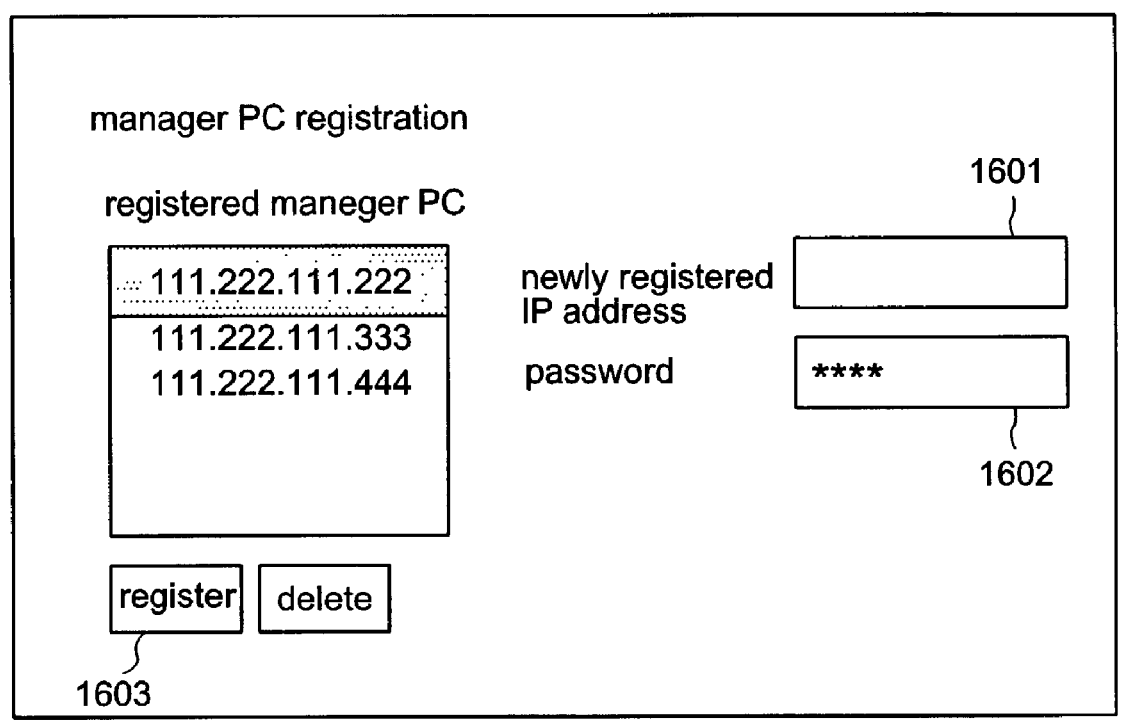
FIG. 16 illustrates a screen for registering a manager client computer according the second embodiment of the present invention.

First, the manager registration operation at manager registration unit 501 is illustrated. When terminal 3 accesses web server 41, terminal 3 can display "apparatus list display screen" shown in FIG. 11. When the user clicks "manager setting" button 112 provided in the "apparatus list display screen", web server 41 allows terminal 3 to display "manager PC registration screen" shown in FIG. 16. As shown in FIG. 16, an IP address of a terminal to be registered as a manager terminal is input in newly registered IP address input box 1601 provided in "manager PC registration screen", and an arbitrary password is input in password input box 1602. Then, by clicking registration button 1603, the newly registered IP address and password are notified to web server 41, and manager registration is requested. Additionally, a password is separately registered to give permission as a manger.

Upon detecting the manager registration request from received data from terminal 3, web server 41 delivers the newly registered IP address and password to manager registration unit 501 to request a new registration. After checking the password to verify the permission, manager registration unit 501 registers the newly registered IP address, which is delivered from web server 41, as manager information in a memory (not shown in the figure). When deleting the manager information, deletion process is executed upon verifying the same password.

Next, the operation for accessing the web server 41 from a manger terminal and for making the job information obtaining request is illustrated.

When printer 2 is selected at the manager terminal, and "job information" button 1202 is clicked by displaying the page shown in FIG. 12, manager terminal transmits a job information obtaining request to web server 41 in HTTP.

Upon detecting the job information obtaining request, web server 41 retrieves the job information from printer 2, similar to the described fist embodiment, to store the information in job information storage unit 43. Also, IP address detector 46 analyzes the job information obtaining request, obtains the IP address of the manager terminal (requester), and informs the manager determiner 502.

Manager determiner 502 determines whether the IP address received from IP address detector 46 is identical with the pre-registered IP address of the manager terminal. When there is an identical IP address of the manager terminal in the pre-registered IP addresses, the job information obtaining request is recognized as one from the manager terminals, and HTML file generator 42 is informed that the request is from the manager terminal. When there is no identical IP address of the manager terminal in the pre-registered IP addresses, HTML file generator 42 is informed that the request is from a non-manager terminal.

HTML file generator 42 generates a job list display screen based on the determination result from job control capability determiner 44, similar to the first embodiment, when it is informed that the request is from a non-manager terminal. When the HTML file generator 42 is informed that the request is from a manager terminal, it performs the same process as in a case where "control is allowed" determination result is given to all of the jobs in the job list. In other words, HTML data is generated in which selectable checkbox 401 is displayed for all of the jobs in the job list. The following process is the same as in the first embodiment, and the manager terminal can control all of the jobs in the job list.

According to the second embodiment, manager terminal is pre-registered so that the control for all of the jobs is easily performed, without inputting passwords.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2001-374665 filed on Dec. 7, 2001, entire content of which is expressly incorporated by reference herein.

What is claimed is:

1. A server apparatus connected to a printer and to a plurality of client terminals, comprising:
   a print job obtainer configured to obtain, from the printer, information that identifies one of the plurality of client terminals and a print job, the one of the plurality of client terminals requesting the printer to print the print job;
   a request obtainer configured to obtain a request for editing the print job stored in the printer from the one of the plurality of client terminals, the request including predetermined information that identifies the one of the plurality of client terminals; and
   a controller configured to determine whether the information obtained by the print job obtainer includes the predetermined information that identifies the one of the plurality of client terminals obtained by the request obtainer, the controller being further configured to transmit, to the one of the plurality of client terminals, predetermined list data including the print job which the one of the plurality of client terminals can access, when it is determined that the information obtained by the print job obtainer includes the predetermined information identifying the one of the plurality of client terminals obtained by the request obtainer, so that the one of the plurality of client terminals can instruct the server apparatus to edit the print job using the predetermined list data without inputting a password at the one of the plurality of client terminals, and the instructed server apparatus instructs the printer to edit the print job specified by the one of the plurality of client terminals.

2. The server apparatus according to claim 1, wherein the predetermined list data includes a print job which the one of the plurality of client terminals cannot access when it is determined that the information obtained by the print job obtainer does not include the information that identifies the one of the plurality of client terminals obtained by the request obtainer.

3. The server apparatus according to claim 1, wherein the information that identifies the one of the plurality of client terminals comprises an IP address of the one of the plurality of client terminals.

4. The server apparatus according to claim 1, wherein the information that identifies the one of the plurality of client terminals comprises a machine name of the one of the plurality of client terminals.

5. The server apparatus according to 1, wherein the predetermined list data is generated in HTML.

6. The server apparatus according to 1, wherein the one of the plurality of client terminals instructs the server apparatus to delete the print job, and the server apparatus instructs the printer to delete the print job specified by the one of the plurality of client terminals.

7. The server apparatus according to 1, wherein the one of the plurality of client terminals instructs the server apparatus to hold the print job, and the server apparatus instructs the printer to hold the print job specified by the one of the plurality of client terminals.

8. The server apparatus according to 1, wherein the one of the plurality of client terminals instructs the server apparatus to perform a predetermined print job specified by the one of the plurality of client terminals prior to other print jobs of the one of the plurality of client terminals, and the server apparatus instructs the printer to perform the predetermined print job prior to other print jobs of the one of the plurality of client terminals.

9. A server apparatus connected to a printer and to a plurality of client terminals, comprising:
   a memory configured to store predetermined information that identifies an administrator of the plurality of client terminals;

a print job obtainer configured to obtain, from the printer, information that identifies the plurality of client terminals and at least one print job, the plurality of client terminals requesting the printer to print the at least one print job;

a request obtainer configured to obtain, from the administrator, a request to edit the at least one print job stored in the printer, the request including the predetermined information that identifies the administrator; and a controller configured to transmit, to the administrator, predetermined list data that includes the at least one print job which the plurality of client terminals can access, when it is determined that the request includes the predetermined information that identifies the administrator, so that the administrator can instruct the server apparatus to edit the at least one print job stored in the printer using the predetermined list data without inputting a password at the administrator, and the instructed server apparatus instructs the printer to edit the at least one print job specified by the administrator.

10. A method for controlling a print job using a server apparatus, the server apparatus being connected to a printer and to a plurality of client terminals, comprising: obtaining information that identifies one of the plurality of client terminals and a print job, from the printer, the one of the plurality of client terminals requesting the printer to print the print job;

obtaining a request for editing the print job stored in the printer from the one of the plurality of client terminals, the request including predetermined information that identifies the one of the plurality of client terminals;

determining whether the obtained information includes the predetermined information that identifies the one of the plurality of client terminals obtained from the one of the plurality of client terminals by the request; and transmitting, to the one of the plurality of client terminals, predetermined list data including the print job which the one of the plurality of client terminals can access when it is determined that the obtained information includes the predetermined information identifying the one of the plurality of client terminals obtained by the request, so that the one of the plurality of client terminals can instruct the server apparatus to edit the print job using the predetermined list data without inputting a password at one of the plurality of client terminals, and the instructed server apparatus instructs the printer to edit the print job specified by the one of the plurality of client terminals.

* * * * *